United States Patent
Koizumi

[15] 3,649,126
[45] Mar. 14, 1972

[54] SLIT EXPOSURE DEVICE FOR A REPRODUCTION APPARATUS

[72] Inventor: Yutaka Koizumi, Tokyo, Japan
[73] Assignee: Kabushiki Kaisha Ricoh, Tokyo, Japan
[22] Filed: Sept. 5, 1968
[21] Appl. No.: 757,537

[30] Foreign Application Priority Data

Sept. 20, 1967   Japan.................................42/60357

[52] U.S. Cl.............................355/65, 355/8, 355/84, 355/100
[51] Int. Cl.................................G03b 27/16, G03b 27/30
[58] Field of Search.....................355/8, 44, 45, 66, 77, 81, 355/18, 55, 57, 65, 84, 100

[56] References Cited

UNITED STATES PATENTS

| | | |
|---|---|---|
| 3,330,181 | 7/1967 | Jakobson..................................355/66 |
| 3,366,003 | 1/1968 | Williamson..............................355/66 |
| 3,431,053 | 3/1969 | Wick et al.................................355/66 |

*Primary Examiner*—Joseph F. Peters, Jr.
*Attorney*—Waters, Roditi, Schwartz & Nissen

[57] ABSTRACT

An optical scanning and reflecting system is disclosed for use in a document copying apparatus in which photosensitive paper is exposed by the image of an original document. Light from the original document is reflected by three moving mirrors through a fixed lens and is projected through a slit upon photosensitive paper which is moved in coordination with the movement of the three reflecting mirrors. Two mirrors move in a plane parallel to the original document and the third mirror moves perpendicular thereto.

7 Claims, 3 Drawing Figures

Patented March 14, 1972
3,649,126
Fig. 1
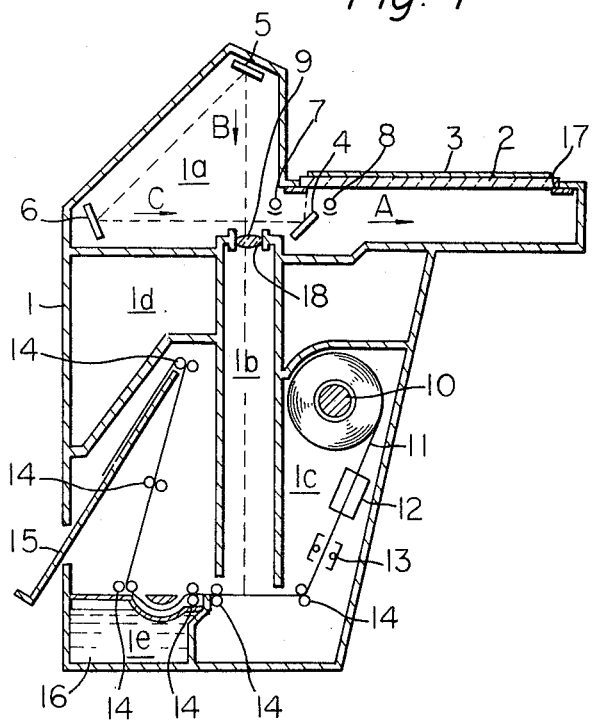
Fig. 2
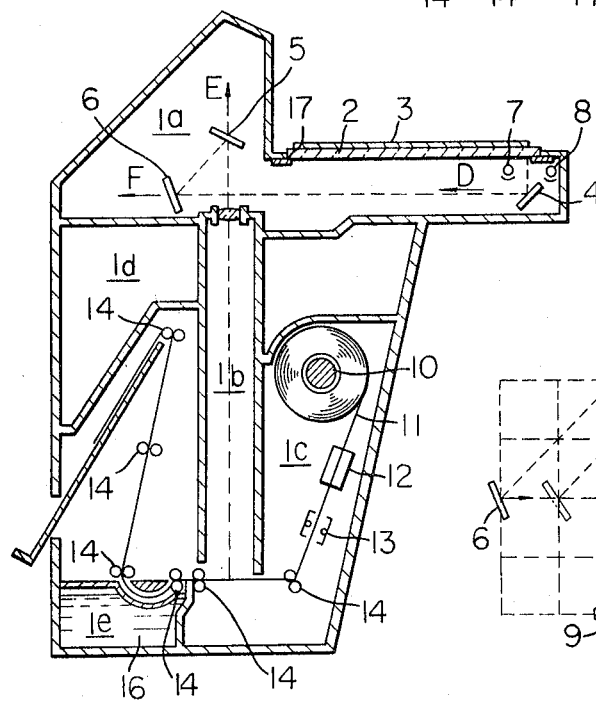
Fig. 3

SLIT EXPOSURE DEVICE FOR A REPRODUCTION APPARATUS

The present invention relates to an improvement in a slit exposure device for a reproduction apparatus with an exposure slit.

It is an object of the present invention to provide a compact slit exposure device.

According to the invention, this is achieved by a system of three relatively movable reflecting mirrors which scan an original and transmit an image thereof to advancing photosensitive paper.

For a better understanding of the invention, reference is made to the following detailed description of the invention taken in conjunction with the accompanying drawings wherein:

FIG. 1 is a sectional view of the slit exposure device of the invention, which shows the state at the beginning of exposure;

FIG. 2 is a sectional view of said device when it has finished the exposure; and FIG. 3 is a diagram illustrating the principle of the invariance of the optical length in the invention.

A glass plate 2 is fixed at an upper hole 17 of the housing 1 of the reproduction apparatus and serves as an original set stand for an original 3. The inside of the housing is divided into five parts, i.e., an illumination part 1a, a slit part 1b, a roller part 1c, an electric control part 1d and a developing part 1e. In the illumination part 1a, there are a first moving reflection mirror 4, a second moving reflection mirror 5, a third moving reflection mirror 6 and illumination light sources 7 and 8 with reflector shades, all of which can move in the part 1a. The first moving reflection mirror 4 makes an angle of 45° with the original surface 3, the second reflection mirror 5 makes an angle of 22°30' and the third moving reflection mirror 6 makes an angle of 67°30' with the surface respectively. The first reflection mirror 4 and the illumination light sources 7 and 8 can move as a unit in the direction parallel to the original surface as shown by arrow A through a suitable motor drive mechanism. In accordance with this movement of the first reflection mirror 4, the second moving reflection mirror 5 can move in the direction perpendicular to the original surface as shown by arrow B and the third reflection mirror 6 can move in the direction parallel to the original surface as shown by arrow C. Moreover, at the boundary between the illumination part 1a and the slit part 1b, there is provided a hole 18 and a lens 9 is fixed with its optical axis making 90° with the original surface. In the roller part 1c, a roller shaft 10 is installed on which a roll of photosensitive paper 11 can be mounted. The photosensitive paper 11 can be drawn out by a suitable drive mechanism in unison with the movements of the moving reflection mirrors 4, 5 and 6 and the illumination light sources 7 and 8. In the moving path of the photosensitive paper 11, there are a cutter 12 for cutting the photosensitive paper 11, a charger 13 for charging the photosensitive paper 11 through corona discharge, a guide roller 14 and a photosensitive paper receiver 15. In the electric control part 1d, there are a power transformer, a motor drive mechanism and other electric means, and the developing part 1e is filled with developing liquid 16.

The slit exposure device of the invention is composed as described above, and when an original is placed face down on the glass plate 2 and a switch in the electric control part 1d is turned on, the illumination light sources 7 and 8 are turned on and the s$rface of the original is illuminated. At the same time, the first moving reflection mirror 4 and the illumination light sources 7 and 8 begin to move as a unit in the direction indicated by the arrow A from the state shown in FIG. 1, and the second moving reflection mirror 5 and the third moving reflection mirror 6 move in the directions of the arrows B and C respectively. Meanwhile, the photosensitive paper 11 moving in synchronism with those movements, is charged negatively by the charger 13 and passes the end face of the slit part 1b. The light from the original surface is reflected by the reflection mirrors 4, 6 and 5, passes through the lens 9 and makes an image on the photosensitive paper 11. In this way, the image is exposed through each slit in sequence and when the entire exposure is finished, the exposure device is in the state shown in FIG. 2 and the photosensitive paper 11 is cut by the cutter 12. The exposed photosensitive paper 11 is guided by the guide roller 14, developed by the liquid developer 16 and discharged onto the photosensitive paper receiver 15.

Before the second exposure is started, from the state shown in FIG. 2, the first moving reflection mirror 4 and the illumination light sources 7 and 8 move in the direction of arrow D, the second moving reflection mirror 5 moves in the direction of arrow E, and the third reflection mirror 6 moves in the direction of arrow F. In this way, they all return to the state shown in FIG. 1.

Here, if the optical path length between the original surface and the lens 9 is kept constant, and when the moving reflection mirrors 4, 5 and 6 move in unison with one another, the focal plane can always be kept on the photosensitive paper. Assuming that each of the moving reflection mirrors moves from the position shown in solid lines to the position shown in chain lines and each of the distances of the movements of the second and the third moving reflection mirrors 5 and 6 are $x$, the optical path length $l_1$ from the original surface to the lens 9 in the case of the solid line can be known in FIG. 3 as $$l_1 = (8 + 2\sqrt{2})x \tag{1}$$

The optical path length $l_2$ from the original surface to the lens in the case of a two-dotted chain line is $$l_2 = (6 + \sqrt{2})x + y \tag{2}$$

Herein $y$ is the distance of the movement of the first reflection mirror 4. In the equations (1) and (2), $l_1 = l_2$ leads to $$(8 + 2\sqrt{2})x = (6 + \sqrt{2})x + y$$

$$\therefore y = (2 + \sqrt{2})x$$

$$\doteq 3.414x$$

That is, the speed of the first moving reflection mirror 4 should be 3.414 times as high as that of the second moving reflection mirror 5 and the third moving reflection mirror 6.

In the existing reproduction apparatus, there are several kinds, for example, one in which an original and sensitive paper are both fixed and they are exposed at the same time just as in an ordinary enlarger, another wherein an original is moved in unison with the movement of a photosensitive paper which is exposed through a slit, another in which a slit plane is moved in accordance with the movement of a lens, etc. Among them, in the system wherein an original and sensitive paper are both fixed, the body must become extremely large and it is quite difficult to illuminate the original uniformly. In the system in which an original moves together with the photosensitive paper, only a part of the original is illuminated through the slit exposure system, and the device per se becomes considerably smaller than the system with a fixed original and fixed photosensitive paper and a high quality lens is not required. However, since the original itself must be moved, the operation is difficult and some kinds of originals cannot be used. Furthermore, in a system wherein an original and a photosensitive paper are fixed and a lens and a slit are moved, the size becomes the same as the first one though it employs a slit exposure system, and the structure also becomes complicated because the movement of the photosensitive paper is intermittent.

The invention employs a slit exposure system wherein the internal reflection mirrors move while the original is fixed, and the space which the photosensitive paper occupies at the exposure position is so small that the device can be made very compact and it is possible to construct a desk-type device. Moreover, it is not necessary to stop the photosensitive paper so that the invention provides a reproduction apparatus which is simple in structure, easy to handle and high in efficiency. While the present invention has been particularly described in terms of a specific embodiment thereof, it will be understood that numerous deviations therefrom and modifications thereupon may be readily devised by those skilled in the art without departing from the present invention.

What is claimed is:

1. Apparatus for reproducing an image-carrying original on photosensitive paper, said apparatus comprising a housing for supporting the original in a first plane, a first reflecting mirror supported in said housing for movement parallel to said first plane, a second reflecting mirror facing said first mirror and supported in said housing for movement along the same axis of movement as said first mirror, a third reflecting mirror supported in said housing for movement perpen;icular to the axis of movement of the first and second reflecting mirrors, and illumination means for illuminating said original, said first, second and third reflecting mirrors being oriented relative to one another and movable relative to one another at particular speeds to scan the original and successively reflect an image thereof from the first to the second to the third mirrors in succession and then onto photosensitive paper which moves in unison with the first, second and third reflecting mirrors whereby to expose the photosensitive paper.

2. Apparatus as claimed in claim 1 wherein said first reflecting mirror is supported at an acute angle relative to said first plane.

3. Apparatus as claimed in claim 1 including a fixed lens interposed between said third reflecting mirror and said photosensitive paper.

4. Apparatus as claimed in claim 1 wherein said illumination means is supported for movement in unison with said first reflecting mirror parallel to said first plane.

5. Apparatus as claimed in claim 1 including a roller for supporting said photosensitive paper in a roll, and guide means for directing a portion of said photosensitive paper from said roller to a position of exposure in said housing to receive the reflected image.

6. Apparatus as claimed in claim 5 including developing means for developing the image reflected onto said photosensitive paper.

7. A slit exposure device for a reproduction apparatus which comprises a first moving reflection mirror making an angle of 45° with respect to a fixed original surface, a second moving reflection mirror making an angle of 22°30′ with the surface, a third moving reflection mirror making an angle of 67°30′ with the surface and a fixed lens whose optical axis makes an angle of 90° with respect to the original surface, said first moving reflection mirror moving in a direction parallel to the original surface at a speed of $2+\sqrt{2}$ times as great as that of the second and the third reflection mirrors, said second moving reflection mirror moving in a direction at 90° with respect to the original surface in accordance with the movement of the first moving reflection mirror, said third moving reflection mirror moving in a direction parallel to the original surface at the same speed as that of the second moving reflection mirror, light from the original surface being reflected by the first, the third and the second reflection mirrors in sequence, passing through said fixed lens and being projected through a slit upon a photosensitive paper which moves in unison with the first, the second and the third moving reflection mirrors.

* * * * *